(12) United States Patent
Saito et al.

(10) Patent No.: US 6,444,344 B1
(45) Date of Patent: Sep. 3, 2002

(54) MATERIAL FOR FUEL CELL SEPARATOR AND FUEL CELL SEPARATOR MADE FROM SAID MATERIAL

(75) Inventors: Kazuo Saito; Atsushi Hagiwara, both of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/350,371

(22) Filed: Jul. 9, 1999

(30) Foreign Application Priority Data

Jul. 13, 1998 (JP) ............................................. 10-197414

(51) Int. Cl.⁷ ............................. H01M 2/00; H01M 2/14
(52) U.S. Cl. ............................................. 429/34; 429/30
(58) Field of Search ............................. 429/18, 29, 30, 429/33, 41, 44, 46, 34

(56) References Cited

U.S. PATENT DOCUMENTS 5,108,855 A * 4/1992 Daifuku et al.
5,977,241 A * 11/1999 Koloski et al. .............. 524/502

* cited by examiner

*Primary Examiner*—Patrick Ryan
*Assistant Examiner*—Tracy Dove
(74) *Attorney, Agent, or Firm*—Kubovcik & Kubovcik

(57) ABSTRACT

The present invention provides a material for a fuel cell separator obtained by molding a mixture containing at least a conductive powder and a binder which is a rubber-modified phenolic resin, and a fuel cell separator made from the above material.

The material for fuel cell separator alleviates the problems of the prior art, is superior in impact resistance or tenacity, causes no rupture or the like when made into a thin plate and used in a fuel cell, and is equivalent to conventional products in density and electrical properties.

17 Claims, No Drawings

MATERIAL FOR FUEL CELL SEPARATOR AND FUEL CELL SEPARATOR MADE FROM SAID MATERIAL

BACKGROUND OF THE INVENTION

(1) Field of the Invention

The present invention relates to a material for fuel cell separator and a fuel cell separator made from said material. More particularly, the present invention relates to a material for fuel cell separator, superior in impact resistance or tenacity, as well as to a fuel cell separator made from said material.

(2) Description of the Prior Art

Fuel cells are advantageous in that they require substantially no fossil fuel (whose depletion in the near future is feared) and, when used for power generation, generate substantially no noise and are high in energy recovery as compared with other methods for power generation. Therefore, fuel cells are being developed as a power generation plant of relatively small size for buildings and factories.

Among fuel cells, a solid polymer type fuel cell operates at lower temperatures than other types of fuel cells. Because of this, the parts constituting the cell suffer little corrosion and the cell can discharge a relatively large electric current for the low temperature operation. Therefore, the solid polymer type fuel cell is drawing attention as a substitute electric source for internal combustion engines in vehicles.

Among the parts constituting the above solid polymer type fuel cell, the separator is generally a flat plate having a plurality of parallel grooves (function as flow channels) formed at one or both sides, and has a role of transferring the electricity generated at the gas diffusion electrode of fuel cell, to the exterior and also a role of discharging the water formed in the grooves in the course of electricity generation, to reliably use each groove as a path for a reactant gas which is allowed to flow into the fuel cell.

As fuel cells have become lighter and thinner in recent years, it has become necessary that the separators be made thinner as well. However, conventional fuel cell separators or materials for the separators have been unable to satisfy this necessity.

That is, conventional fuel cell separators are obtained, for example, by machining a graphite plate impregnated with a thermosetting resin, or by molding an expanded graphite sheet into a separator shape. These fuel separators or materials for the separators have low impact resistance or tenacity when made as a thin plate and, as a result, break when used in a fuel cell or, even if no such breakage occurs, are unusable per se in fuel cells for automobiles or in portable fuel cells (wherein use conditions may be severe). cells for automobile or in portable fuel cells (wherein use conditions may be sever).

SUMMARY OF THE INVENTION

The present invention aims at providing a material for a fuel cell separator, which alleviates the above-mentioned problems of the prior art, is superior in impact resistance or tenacity causes no breakage or the like when made into a thin plate and used in a fuel cell, and is equivalent to conventional products in density and electrical properties; and a fuel cell separator made from the material.

According to the present invention, there are provided:
 a material for a fuel cell separator obtained by molding a mixture containing at least a conductive powder and a binder which is a rubber-modified phenolic resin; and
 a fuel cell separator made from the above material.

DETAILED DESCRIPTION OF THE INVENTION

As the conductive powder in the present invention, there can be used, for example, a powder of a carbon material typified by natural graphite (e.g. scaly graphite or lumpy graphite), artificial graphite, acetylene black, carbon black, Ketjen black, expanded graphite or the like. There is no particular restriction as to the kind of the conductive powder as long as the powder is conductive.

The conductive powder can have an average particle diameter of, for example, 10 nm to 100 $\mu$m, preferably, 3 $\mu$m to 80 $\mu$m. When the average particle diameter is 10 nm or more, excellent formability is achieved, and when the average particle diameter is 100 $\mu$m or less, excellent conductivity is achieved. The conductive powder may be subjected, as necessary, to a hydrophilization treatment by control of firing conditions or by using a chemical, a gas or the like. These conductive powders can be used singly or in admixture of two or more kinds.

The conductive powder is molded together with a binder to become a material for a fuel cell separator, of the present invention. In the present invention, a rubber-modified phenolic resin is used as the binder.

The rubber-modified phenolic resin can be obtained by reacting an unvulcanized rubber with a phenolic resin. As the unvulcanized rubber, fluororubber, silicone rubber, butyl rubber, chloroprene rubber, nitrile rubber, nitrile-chloroprene rubber, chlorinated butyl rubber, chlorinated polyethylene, epichlorohydrin rubber, epichlorohydrin-ethylene oxide rubber, epichlorohydrin-ethylene oxide-acryl glycidyl ether terpolymer, urethane rubber, acrylic rubber, ethylene-propylene rubber, styrene rubber, butadiene rubber, natural rubber, etc., can be used. These rubbers can be used singly or in admixture of two or more kinds.

The rubber-modified phenolic resin can have a rubber modification degree of 10 to 90%, preferably, 10 to 30%. When the rubber modification degree is 10% or more, the rubber-modified phenolic resin is low in elastic modulus and a separator improved in impact resistance can be obtained. When the rubber modification degree is 90% or less, particularly 40% or less, the properties of the resin used for modification are not changed largely and the resulting separator is not low in strength.

Incidentally, the rubber modification degree can be determined by the following formula:

$$[(\text{weight of unvulcanized rubber})/(\text{weight of unvulcanized rubber} + \text{weight of phenolic resin})] \times 100$$

The material for a fuel cell separator, of the present invention can be obtained by molding the conductive powder and the rubber-modified phenolic resin as binder. The proportions of the conductive powder and the rubber-modified phenolic resin can be 100 parts by weight (the conductive powder) and 5 to 50 parts by weight (the rubber-modified phenolic resin). When the proportion of the rubber-modified phenolic resin is 5 parts by weight or more, the resulting material for fuel cell separator can have high impact resistance. When the proportion of the rubber-modified phenolic resin is 50 parts by weight or less, the resulting material can give a fuel cell separator reliably having a required conductivity.

In molding the conductive powder and the rubber-modified phenolic resin to produce a material for a fuel cell separator, of the present invention, these two raw materials are mixed first. The mixing can be conducted by a known industrial method such as stirring rod, kneader, ball mill, sample mill, mixer, static mixer, ribbon mixer or the like. In this case, in order to expect improved molding, the rubber-modified, phenolic resin may be dissolved in an appropriate solvent, followed by granulation.

The thus-obtained mixture of the conductive powder and the rubber-modified phenolic resin is shaped into a desired molding, i.e. a material for fuel cell separator, of the present invention. This shaping can be conducted by a known molding method such as pressure molding, hydrostatic pressure molding, extrusion molding, injection molding, belt press, press molding, press heating, roll pressing or the like, or by a combination of the above two or more molding methods.

The temperature employed in shaping the mixture is determined depending upon the resin used in the mixture, but can be, for example, any temperature between ambient and 400° C. The pressure employed in shaping can be, for example, 100 to 250 kg/cm². In order to chemically stabilize the molding obtained, the molding may be heat-treated.

The fuel cell separator of the present invention is produced from the above-obtained material for a fuel cell separator, of the present invention. In general, the fuel cell separator has paths (function as a flow field) for gas flow, grooves for discharging the water generated in the electricity-generating reaction of cell, etc.; therefore, the fuel cell separator can be produced by forming such paths, grooves, etc. in the above-mentioned shaping step for the material for a fuel cell separator, or by forming, after the shaping step, the paths, grooves, etc. using an appropriate means such as machining or the like.

As determined from bending tests, the fuel cell separator of the present invention has an elastic modulus of 40 to 1 GPa and a deflection at rupture of 0.1 to 3 mm. Therefore, the fuel cell separator causes no rupture or the like when made into a thin plate and used in a fuel cell.

Incidentally, the elastic modulus was measured according to JIS K 6911. That is, a test piece of 100 mm in length, 4±0.2 mm in height and 10±0.5 mm in width was produced; the test piece was supported by two fulcrums apart by a distance of 64±0.5 mm; a load (a pressure wedge) was applied to the test piece at the center of the two fulcrums; loads and deflections (mm) were measured up to the time when the test piece was broken; and a load-deflection curve was prepared. The elastic modulus of the test piece was calculated from the following formula.

$$E_f = (L_v^3/4Wh^3) \times (F/Y) \times (1/1000)$$

wherein $E_f$=elastic modulus in bending (GPa),

Lv=length (distance) between fulcrums (mm),

W=width of test piece (mm), h=height of test piece (mm), and

F/Y=gradient of the straight-line portion of load-deflection curve (N/mm)

Moreover, the fuel cell separator of the present invention has a bulk density of 1.7 to 2.0 g/cm³, a resistivity of 5 to 40 mΩ·cm and a Shore hardness of 2 to 30; thus, the present fuel cell separator is equivalent to conventional products in density and electrical properties.

The present invention is described in more detail below by way of Examples.

EXAMPLES 1 to 5

A scaly graphite powder (as conductive powder) having an average particle diameter of 30 μm and an acrylic rubber-modified phenolic resin having a rubber modification degree shown in Table 1 were mixed in proportions shown in Table 1, for 10 minutes using a mixer. The resulting mixture was placed in a mold of 200 mm×200 mm and molded into a separator shape under the conditions of mold temperature=160° C., molding pressure=150 kg/cm² and molding time=5 minutes. The molding obtained was measured for bulk density, resistivity, elastic modulus in bending, deflection at rupture in bending test, and Shore hardness. Separately, a fuel cell separator having a thickness of 1.0 mm was produced in the same manner and used in a fuel cell; and the condition of the separator in the cell was observed. The results are shown in Table 1.

EXAMPLES 6 and 7

A fuel cell separator was produced in the same manner as in Example 1 or 5 except that the acrylic rubber-modified phenolic resin was changed to a silicone rubber-modified phenolic resin having a rubber modification degree of 20%. The separator was measured for properties in the same manner as in Examples 1 to 5, and also the condition of the separator when used in a fuel cell was observed. The results are shown in Table 1.

TABLE 1

| Examples | 1 | 2 | 3 | 4 | 5 | 6 | 7 |
|---|---|---|---|---|---|---|---|
| Conductive carbon powder | 100 | 100 | 100 | 100 | 100 | 100 | 100 |
| Acrylic rubber-modified phenolic resin | 30 | 30 | 30 | 30 | 10 | | |
| Silicone rubber-modified phenolic resin | | | | | | 30 | 10 |
| Rubber modification degree | 10 | 20 | 30 | 90 | 20 | 20 | 20 |
| Bulk density (g/cm³) | 1.85 | 1.78 | 1.77 | 1.70 | 1.78 | 1.81 | 1.82 |
| Resistivity (mΩ · cm) | 30 | 30 | 29 | 29 | 12 | 19 | 9 |
| Elastic modulus in bending (GPa) | 25 | 8 | 4 | 1 | 7 | 18 | 15 |
| Deflection at rupture in bending test (mm) | 0.15 | 0.40 | 0.80 | 1.00 | 0.20 | 0.20 | 0.15 |
| Shore hardness | 29 | 25 | 12 | 10 | 10 | 11 | 13 |
| Condition when used in fuel cell | Good | Good | Good | Good | Good | Good | Good |

COMPARATIVE EXAMPLE 1

A fuel cell separator was produced in the same manner as in Example 1 that the acrylic rubber-modified phenolic resin was changed to a phenolic resin. The separator was measured for properties in the same manner as in Examples 1 to 5, and also the condition of the separator when used in a fuel cell was observed. The results are shown in Table 2.

COMPARATIVE EXAMPLE 2

A fuel cell separator was produced in the same manner as in Example 1 except that no acrylic rubber-modified phenolic resin was used. The separator was measured for properties in the same manner as in Examples 1 to 5, and also the condition of the separator when used in a fuel cell was observed. The results are shown in Table 2.

TABLE 2

| Comparative Examples | 1 | 2 |
|---|---|---|
| Conductive carbon powder | 100 | 100 |
| Phenolic resin | 30 | |
| Bulk density (g/cm³) | 1.95 | 1.90 |
| Resistivity (mΩ · cm) | 35 | 5 |
| Elastic modulus in bending (GPa) | 45 | 50 |
| Deflection at rupture in bending test (mm) | 0.08 | 0.04 |
| Shore hardness | 40 | 100 |
| Condition when used in fuel cell | Assembling was impossible due to appearance of cracks during assembling | Same as left |

As described above, the fuel cell separator of the present invention is produced from the material for fuel cell separator, of the present invention obtained by molding a mixture containing at least a conductive powder and a binder which is a rubber-modified phenolic resin; is superior in impact resistance or tenacity, causes no rupture or the like when made as a thin plate and used in a fuel cell, and is equivalent to conventional products in density and electrical properties.

What is claimed is:

1. A material for a fuel cell separator obtained by molding a mixture containing at least a conductive powder and a binder which is a rubber-modified phenolic resin.

2. The material for a fuel cell separator according to claim 1, wherein the proportion of said rubber-modified phenolic resin is 5 to 50 parts by weight per 100 parts by weight of said conductive powder.

3. The material for a fuel cell separator according to claim 1, wherein said rubber-modified phenolic resin has a rubber modification degree of 10 to 90%.

4. The material for a fuel cell separator according to claim 1, wherein said conductive powder has an average particle diameter of 10 nm to 100 μm.

5. A fuel cell separator made from a material set forth in claim 1.

6. The fuel cell separator according to claim 5, having an elastic modulus of 40 to 1 Gpa and a deflection at rupture of 0.1 to 3 mm.

7. A fuel cell which uses the separator according to claim 5.

8. The material for a fuel cell separator according to claim 2, wherein said rubber-modified phenolic resin has a rubber modification degree of 10 to 90%.

9. A fuel cell separator made from a material set forth in claim 2.

10. A fuel cell separator made from a material set forth in claim 3.

11. A fuel cell separator made from a material set forth in claim 8.

12. A fuel cell which uses the separator according to claim 6.

13. A fuel cell which uses the separator according to claim 9.

14. A fuel cell which uses the separator according to claim 10.

15. A fuel cell which uses the separator according to claim 11.

16. The material for a fuel cell separator according to claim 3, wherein said rubber-modified phenolic resin has a rubber modification degree of 10 to 40%.

17. The material for a fuel cell separator according to claim 4, wherein said conductive powder has an average particle diameter of 3 μm to 80 μm.

* * * * *